(12) United States Patent
Padour, II

(10) Patent No.: US 10,791,717 B2
(45) Date of Patent: Oct. 6, 2020

(54) POULTRY COOP CARRIAGE AND RAIL SYSTEM AND METHODS OF USING THE SAME

(71) Applicant: Jaroslav E. Padour, II, Crystal Lake, IL (US)

(72) Inventor: Jaroslav E. Padour, II, Crystal Lake, IL (US)

( * ) Notice: Subject to any disclaimer, the term of this patent is extended or adjusted under 35 U.S.C. 154(b) by 0 days.

(21) Appl. No.: 16/870,650

(22) Filed: May 8, 2020

(65) Prior Publication Data

US 2020/0267943 A1    Aug. 27, 2020

Related U.S. Application Data

(63) Continuation of application No. 16/662,382, filed on Oct. 25, 2019.

(60) Provisional application No. 62/754,920, filed on Nov. 2, 2018.

(51) Int. Cl.
*A01K 31/00* (2006.01)
*A01K 31/18* (2006.01)
*A01K 1/00* (2006.01)

(52) U.S. Cl.
CPC ............ *A01K 31/18* (2013.01); *A01K 1/0035* (2013.01)

(58) Field of Classification Search
CPC .... A01K 31/00; A01K 31/002; A01K 31/005; A01K 31/06; A01K 31/07; A01K 31/22
USPC .................................. 119/487–490
See application file for complete search history.

(56) References Cited

U.S. PATENT DOCUMENTS

| 1,109,477 | A |   | 9/1914 | Spanke |   |
|---|---|---|---|---|---|
| 1,727,466 | A | * | 9/1929 | Hatch | A01K 31/002 220/485 |
| 2,524,959 | A |   | 11/1948 | Clark |   |
| 2,474,932 | A | * | 7/1949 | Clark | A01K 31/22 119/487 |
| 3,045,612 | A | * | 7/1962 | Byrnes | A01K 31/17 104/178 |
| 3,302,616 | A | * | 2/1967 | Bradshaw | A01K 3/00 119/488 |
| 4,097,097 | A | * | 6/1978 | Hosko | A47F 5/135 119/488 |
| 5,711,227 | A |   | 1/1998 | Johnson |   |
| 8,282,018 | B2 |   | 10/2012 | Kennard |   |

FOREIGN PATENT DOCUMENTS

| DE | 10014870 | 9/2001 |
|---|---|---|
| GB | 198082 | 2/1922 |

OTHER PUBLICATIONS

US0975733, Stout, Nov. 15, 1910 (Form would not let me add to U.S. patent documents above).

* cited by examiner

*Primary Examiner* — Richard T Price, Jr.
(74) *Attorney, Agent, or Firm* — Scherrer Patent & Trademark Law, P.C.; Stephen T. Scherrer; Monique A. Morneault

(57) ABSTRACT

A poultry coop carriage and rail system comprises a movable poultry coop that may be maneuverable between various positions on an area of land. The poultry coop is moved from one position to another to allow for management and cleaning of the land beneath the poultry coop when moved. Methods of using the same are further provided.

20 Claims, 3 Drawing Sheets

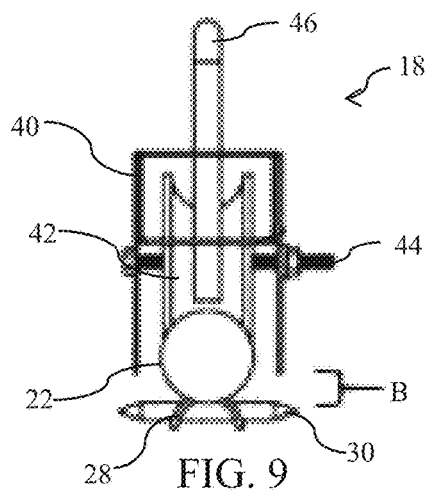
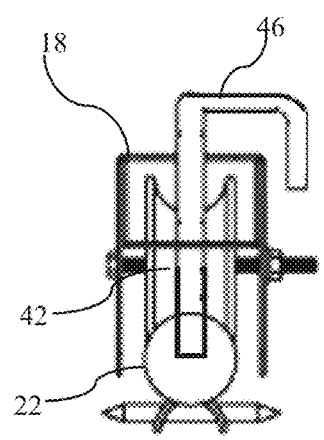
FIG. 9   FIG. 10
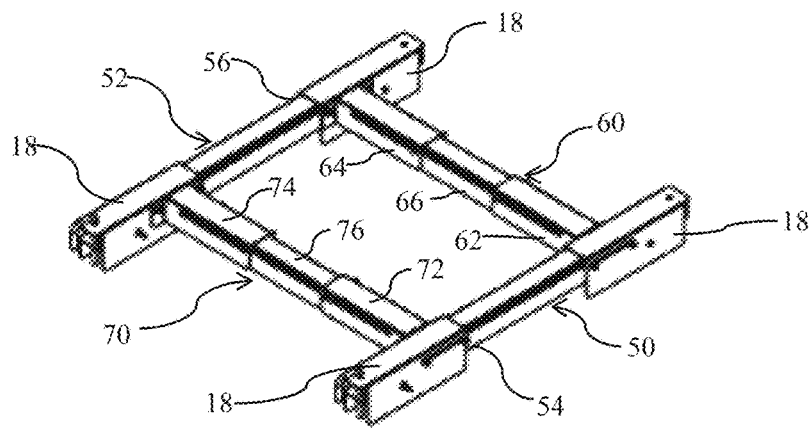
FIG. 11
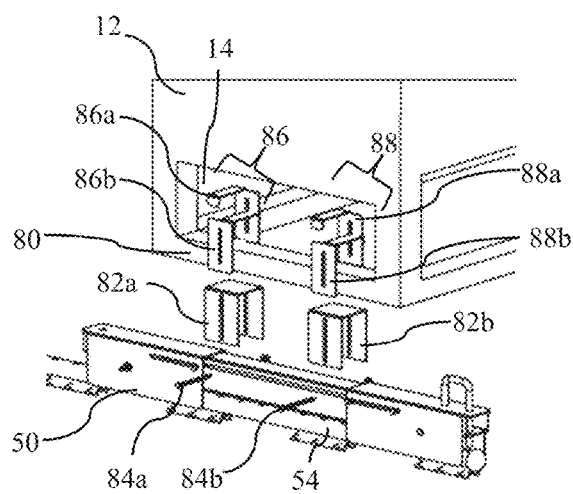
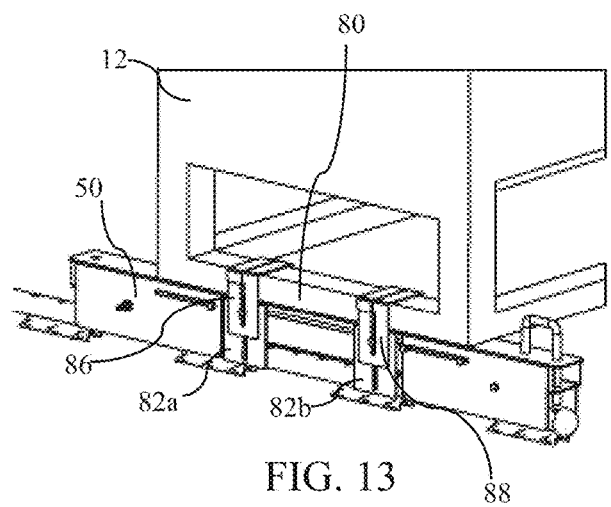
FIG. 12   FIG. 13

POULTRY COOP CARRIAGE AND RAIL SYSTEM AND METHODS OF USING THE SAME

CROSS-REFERENCE TO RELATED APPLICATIONS

The present invention claims priority as a Continuation Application to U.S. patent application Ser. No. 16/662,382, titled "Poultry Coop Carriage and Rail System and Methods of Using the Same," filed Oct. 25, 2019, which claims priority to U.S. Prov. Pat. App. No. 62/754,920, titled "Poultry Coop Carriage and Rail System," filed Nov. 2, 2018, each of which is incorporated herein by reference in its entirety.

TECHNICAL FIELD

The present invention relates to a poultry coop carriage and rail system. Specifically, the poultry coop carriage and rail system comprises a movable poultry coop that may be maneuverable between various positions on an area of land. The poultry coop is moved from one position to another to allow for management and cleaning of the land beneath the poultry coop when moved. Methods of using the same are further provided.

BACKGROUND

Poultry coops, also known as chicken coops and hen houses, are well-known for providing locations of rest and safety for poultry, such as chickens or the like. A typical poultry coop comprises nest boxes found therein for egg-laying, and perches on which the birds can sleep, further providing shelter from weather, such as rain, cold, heat, snow, or other like conditions, and from predators.

A poultry coop usually has an indoor area where the birds can sleep and nest, as well as a fenced-in outdoor area where birds will feed and spend the majority of the day (which is typically made from chicken wire). The coop further typically contains straw therein, operating similar to a litter box. At night, the poultry coop is typically closed and locked with the birds inside, so that they are protected from predators.

Oftentimes, poultry coops have no floors, and are set directly on the ground, typically on an area of grass. As mentioned above, loose straw material is typically used to catch bird droppings and other bird waste that may fall to the ground. Over time, the ground covered by the poultry coop can become damaged and bare. Since the ground is typically covered by the poultry coop, sunlight oftentimes does not get into the chicken coop to promote grass growth, and the ground becomes trampled by the birds further damaging the grass and ground thereunder.

To promote repair and growth of grass, poultry coops may be moved to other locations. However, moving a poultry coop can be extremely difficult. Oftentimes, poultry coops are often made of wood or other like materials, and can be heavy, oftentimes, too heavy for a single person or even two people to move. In many cases, the birds either have to be moved from the poultry coop before moving, or the poultry coop must be moved with birds inside. If not moved correctly, damage can be done to the poultry coop or the birds that may be inside the poultry coop.

A need, therefore, exists for a poultry coop that may be easily moved. Specifically, a need exists for a poultry coop that may be moved from a first position to a second position without damage to the coop or birds that may reside therein.

In addition, a need exists for a poultry coop that may be positioned on a track such that the poultry coop may be moved from the first position to a second position or additional positions. Specifically, a need exists for a poultry coop that may easily roll on the track while minimizing disturbance of animals therein. More specifically, a need exists for a poultry coop that may be moved from one position to another without removing birds from the poultry coop.

Further, a need exists for a poultry coop that may be positioned in one of several positions over an area of ground to aid in the repair and maintenance of the ground where the poultry coop formerly stood. Moreover, a need exists for a poultry coop that maintains its position when unattended so that damage to the poultry coop or to the birds therein is minimized.

SUMMARY OF THE INVENTION

The present invention relates to a poultry coop carriage and rail system. Specifically, the poultry coop carriage and rail system comprises a movable poultry coop that may be maneuverable between various positions on an area of land. The poultry coop is moved from one position to another to allow for management and cleaning of the land beneath the poultry coop when moved. Methods of using the same are further provided.

To this end, in an embodiment of the present invention, A poultry coop carriage and rail system comprising: a first rail disposed on a surface of the ground having a concave upper surface; and a poultry coop having a bottom and a first wheel assembly comprising at least one wheel on the bottom of the poultry coop, wherein the at least one wheel of the first wheel assembly has a convex surface for rolling on the concave upper surface of the first rail.

In an embodiment, the first rail comprises a flange extending from the first rail and embedded in the ground and configured to hold the rail in position on the ground.

In an embodiment, the poultry coop carriage and rail system further comprises: a second rail disposed on the surface of the ground having a concave upper surface; and a second wheel assembly comprising at least one wheel on the bottom of the poultry coop, wherein the at least one wheel of the second wheel assembly has a convex surface for rolling on the concave upper surface of the second rail.

In an embodiment, the second rail comprises a flange extending from the first rail and embedded in the ground and configured to hold the rail in position on the ground.

In an embodiment, the first wheel assembly is proximal to a first end of the poultry coop and the second wheel assembly is proximal a second end of the poultry coop, wherein the first end of the poultry coop is opposite the second end of the poultry coop.

In an embodiment, the poultry coop carriage and rail system further comprises: a crossbeam extending between the first wheel assembly and the second wheel assembly.

In an embodiment, the crossbeam is adjustable in length.

In an embodiment, the concave upper surface of the first rail is formed from a first tube and the flange extends downwardly from the tube into the ground.

In an embodiment, the flange is formed from a partial portion of a second tube attached to a bottom surface of the first tube.

In an embodiment, the poultry coop carriage and rail system further comprises: a stake extending through the flange configured to hold the flange in the ground.

In an embodiment, the wheel assembly comprises a side cover, wherein the side cover has a bottom edge that is configured to be disposed a distance of ¾ inch or less above the ground.

In an embodiment, the poultry coop carriage and rail system further comprises: a third rail disposed on the surface of the ground having a concave upper surface; and a third wheel assembly comprising at least one wheel on the bottom of the poultry coop, wherein the at least one wheel of the third wheel assembly has a convex surface for rolling on the concave upper surface of the second rail.

In an embodiment, the first wheel assembly is proximal to a first end of the poultry coop, the second wheel assembly is proximal a second end of the poultry coop, wherein the first end of the poultry coop is opposite the second end of the poultry coop, and the third wheel assembly is positioned on the bottom of the poultry coop between the first and second wheel assemblies.

In an embodiment, the poultry coop carriage and rail system further comprises: a bracket having a downwardly extending, vertically-disposed element attached to the bottom of the poultry coop and having a vertical slot therein; a horizontal slot in the first wheel assembly; and a connector connecting the downwardly extending, vertically-disposed element of the bracket to the first wheel assembly, wherein the connector comprises a pin disposed through the vertical slot of the downwardly extending, vertically-disposed element and the horizontal slot in the wheel assembly.

In an embodiment, the poultry coop carriage and rail system further comprises: a brake at the first wheel assembly wherein the brake comprises a pin configured to move between an up and a down position, and wherein when the pin is in the down position, the pin engages a hole in the upper surface of the first rail.

In an alternate embodiment of the present invention, a method of moving a movable poultry coop is provided. The method comprises the steps of: providing a poultry coop carriage and rail system comprising a first rail disposed on a surface of the ground having a concave upper surface, and a poultry coop having a bottom and a first wheel assembly comprising at least one wheel on the bottom of the poultry coop, wherein the at least one wheel of the first wheel assembly has a convex surface for rolling on the concave upper surface of the first rail; disposing the poultry coop in a first location on the first rail by engaging the convex surface of the first wheel on the concave surface of the first rail.

In an embodiment, the method further comprises the steps of: providing a brake at the first wheel assembly; and engaging the pin of the brake on the upper surface of the first rail to prevent movement of the first wheel along the first rail.

In an embodiment, the method further comprises the steps of: providing a bracket having a vertically-disposed element attached to the bottom of the poultry coop and having an element extending downwardly, the downwardly extending element having a vertical slot therein; providing a horizontal slot in the first wheel assembly; providing a connector connecting the downwardly extending element of the bracket to the first wheel assembly, wherein the connector comprises a pin disposed through the vertical slot of the downwardly extending element and the horizontal slot in the wheel assembly; and moving the pin within either the vertical slot of the downwardly extending element or the horizontal slot in the wheel assembly to adjust the position of the coop on the wheel assembly.

In an embodiment, the method further comprises the step of: moving the poultry coop to a second location on the first rail by rolling the first wheel along the first rail.

In an embodiment, the method further comprises the steps of: providing a brake at the first wheel assembly; and engaging the brake at the first wheel assembly to prevent movement of the first wheel along the first rail.

It is, therefore, an advantage and objective of the present invention to provide a poultry coop that may be easily moved.

Specifically, it is an advantage and objective of the present invention to provide a poultry coop that may be moved from a first position to a second position without damage to the coop or birds that may reside therein.

In addition, it is an advantage and objective of the present invention to provide a poultry coop that may be positioned on a track such that the poultry coop may be moved from the first position to a second position or additional positions.

Specifically, it is an advantage and objective of the present invention to provide a poultry coop that be easily roll on the track while minimizing disturbance of animals therein.

More specifically, it is an advantage and objective of the present invention to provide a poultry coop that may be moved from one position to another without removing birds from the poultry coop.

Further, it is an advantage and objective of the present invention to provide a poultry coop that may be positioned in one of several positions over an area of ground to aid in the repair and maintenance of the ground where the poultry coop formerly stood.

Moreover, it is an advantage and objective of the present invention to provide a poultry coop that maintains its position when unattended so that damage to the poultry coop or to the birds therein is minimized.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 9 illustrates a front view of a wheel assembly and rail with the wheel assembly in an un-locked position in an embodiment of the present invention.

FIG. 10 illustrates a front view of a wheel assembly and rail with the wheel assembly in a locked position in an embodiment of the present invention.

FIG. 11 illustrates telescoping side and cross channels for holding a poultry coop on a plurality of rails in an embodiment of the present invention.

FIG. 12 illustrates an exploded view of a poultry coop bracket system in an embodiment of the present invention.

FIG. 13 illustrates a side perspective view of a poultry coop bracket system in an embodiment of the present invention.

DETAILED DESCRIPTION OF THE PRESENTLY PREFERRED EMBODIMENTS

The present invention relates to a poultry coop carriage and rail system. Specifically, the poultry coop carriage and rail system comprises a movable poultry coop that may be maneuverable between various positions on an area of land. The poultry coop is moved from one position to another to allow for management and cleaning of the land beneath the poultry coop when moved. Methods of using the same are further provided.

Figure 1:
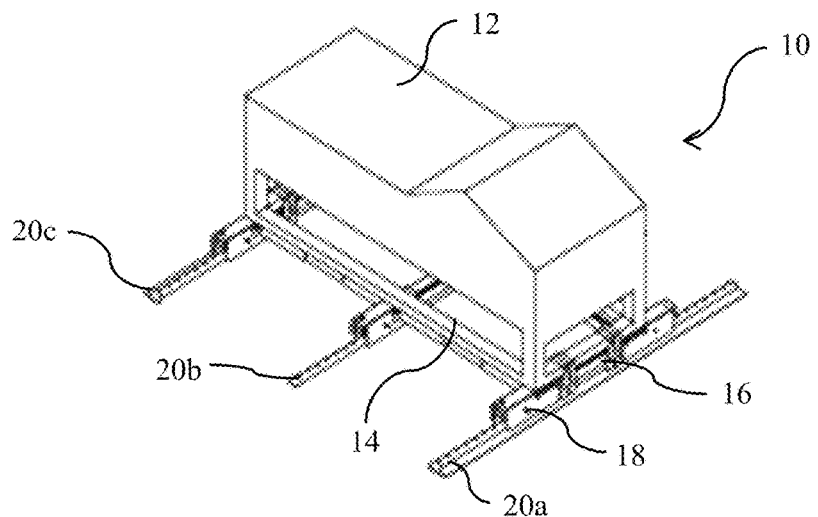
FIG. 1 illustrates a perspective view of a poultry coop carriage and rail system in an embodiment of the present invention.

Now referring to the drawings, wherein like numerals refer to like parts, FIG. 1 illustrates a poultry coop carriage and rail system 10 in an embodiment of the present invention. The system 10 comprises a poultry coop 12 having openings (not shown) therein that allow poultry to enter and exit the poultry coop 12 when desired, as is typical of a poultry coop known to one of ordinary skill in the art, or the poultry coop 12 may be completely enclosed so that hens never leave the coop. Openings 14 may be enclosed using chicken wire, for example, or other covering to enclose the coop and keep the birds contained therein, as desired. The poultry coop 12 is connected to side assemblies 16 having wheel assemblies 18 thereon for sliding on rails 20a, 20b, 20c (collectively, rails 20) that may be on or otherwise embedded in the ground, as described in more detail below.

Figure 2A:
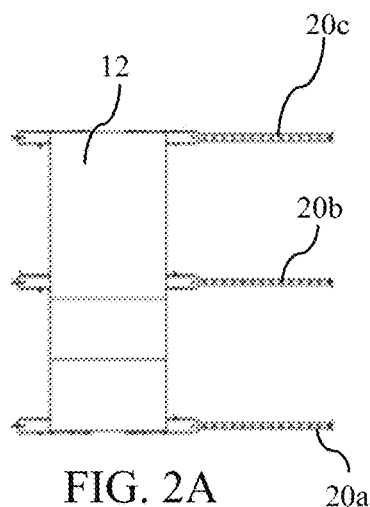
FIGS. 2A, 2B and 2C illustrate top views of various positions of a poultry coop carriage on a rail system in embodiments of the present invention.
Figure 2B:
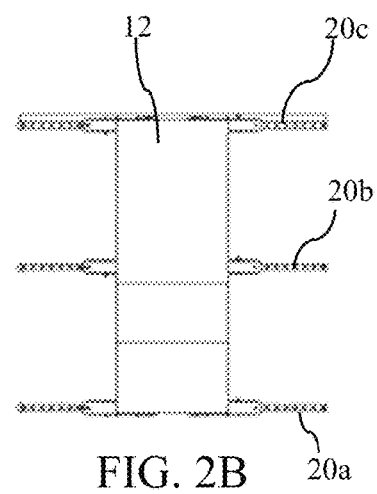
Figure 2C:
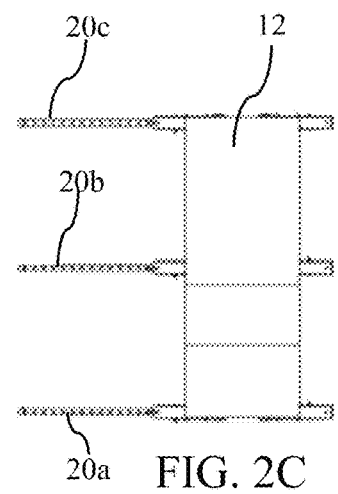

The poultry coop 12 may slide along rails 20a, 20b, 20c and move into various positions as desired, as illustrated in FIGS. 2A, 2B and 2C. Specifically, the poultry coop 12 may be in a first position, shown in FIG. 2A. After a period of time, it may be desirable to move the poultry coop 12 into a second position, as illustrated in FIG. 2B. Thus, the poultry coop 12 may easily slide or roll from the first position shown in FIG. 2A to the second position shown in FIG. 2B by moving the poultry coop 12 along rails 20a, 20b, 20c. Likewise, after a period of time, it may be desirable to move the poultry coop 12 into a third position, as illustrated in FIG. 2C. Thus, the poultry coop 12 may be moved into various positions so that the ground beneath the poultry coop 12 may be repaired, renovated, and/or otherwise allowed to regenerate after use.

Although three rails 20a, 20b, 20c are illustrated in FIGS. 1 and 2A-2C, it should be noted that the poultry coop 12 may sit upon any number of rails and the specific number shown should not limit the invention described herein in any way. For example, there may be only two rails, or alternatively there may be more than three. Moreover, the poultry coop 12 should not be limited as shown and described herein, as the size and configuration may be any size and configuration as desired and as needed for an effective poultry coop. Typically, a relatively small poultry coop may require only two rails for movement thereon, whereas a relatively large poultry coop may require three or more rails for movement thereon.

Figure 3:
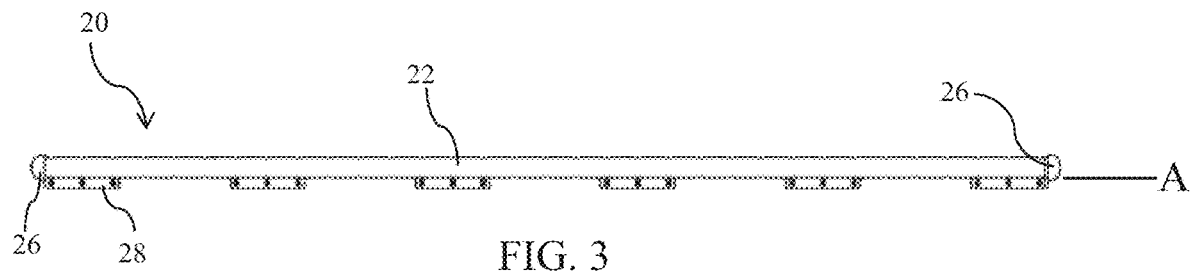
FIG. 3 illustrates a side view of a rail for a poultry coop carriage in an embodiment of the present invention.
Figure 4:
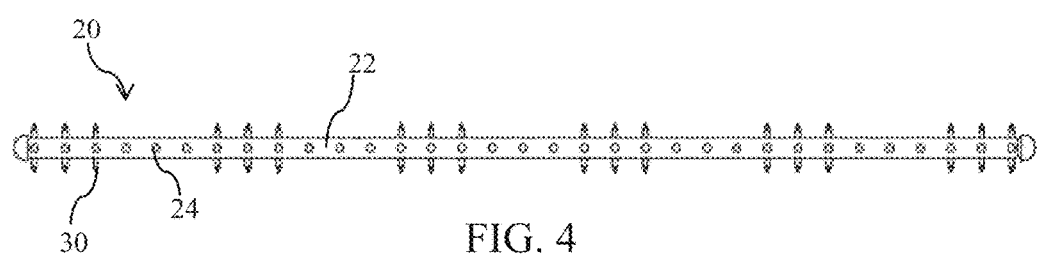
FIG. 4 illustrates a top view of a rail for a poultry coop carriage in an embodiment of the present invention.

FIG. 3 illustrates a side view of a rail 20 that may be utilized in the present invention. The rail 20 may preferably comprise a pipe or tube 22 having a length desirable for moving a poultry coop 12 that may sit and roll thereon. The pipe or tube 22 may include a plurality of holes 24 on a top surface thereof, as illustrated in FIG. 4. Moreover, the pipe or tube 22 may include end caps 26 disposed on opposite ends thereof, which may prevent matter from entering the rails 20, such as small animals, dirt, dust, water or the like. The end caps 26 may also act as stops for a poultry coop 12 that may sit and move thereon.

The pipe or tube 22 may have one or more flanges 28 extending from a bottom thereof. The flanges 28 may be embedded within the ground allowing the pipe or tube 22 to sit on a top surface of the ground "A", as illustrated in FIG. 3. The flanges 28 also provide a securing mechanism to prevent movement of the pipe or tube 22, especially when utilized to hold a poultry coop 12 thereon. Specifically, as shown in FIGS. 4, 5 and 6, anchoring spikes 30 or 32 may be utilized to secure the flanges 28 into the ground to maintain the pipe or tube 22 on a top of a ground surface "A".

Figure 5:
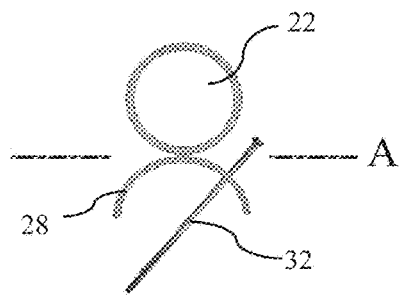
FIG. 5 illustrates a cross-sectional view of a rail for a poultry coop carriage in an embodiment of the present invention.
Figure 6:
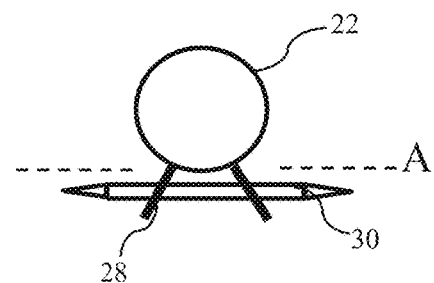
FIG. 6 illustrates a cross sectional view of a rail for a poultry coop carriage in an alternate embodiment of the present invention.

Specifically, as illustrated in FIG. 5, the flanges 28 may comprise a half-pipe that is adhered, bolted, welded, or otherwise held rigidly to a bottom of the pipe or tube 22, wherein the legs of the half-pipe point downward below the ground surface "A", thereby holding the pipe or tube 22 above the ground surface "A". One or more spikes 32 may be disposed through the half-pipe into the ground, preferably at a downward angle but may be disposed horizontally, as shown in FIG. 6, to hold the half-pipe in the ground below the ground surface "A". Likewise, as illustrated in FIG. 6, the flanges 28 may comprise straight legs extending angularly from the bottom of the pipe or tube 22, and one or more spikes 30 may extend through the legs, thereby holding the legs beneath the ground surface "A", but ensuring that the pipe or tube 22 is positioned and held on the ground surface "A".

Figure 7:
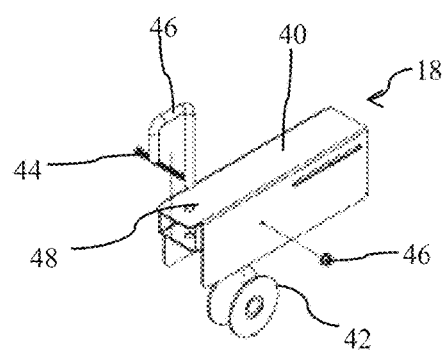
FIG. 7 illustrates an exploded view of a wheel assembly in an embodiment of the present invention.
Figure 8:
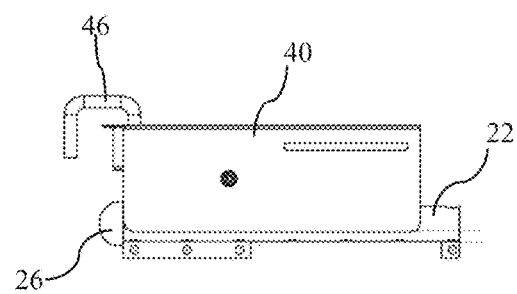
FIG. 8 illustrates a side view of a wheel assembly in an embodiment of the present invention.

Referring to FIG. 7, an exploded view of wheel assembly 18 is illustrated. Wheel assembly 18 may comprise an upside down U-shaped channel 40 that may be sized sufficiently to cover the rail 20 so that a wheel 42 may roll on the rail 20. The wheel 42 may be held via axle 44 and nut 46, allowing the wheel 42 to rotate when placed on the rail 20. A hook-shaped brake pin 46 may be disposed through one or more apertures 48 through the U-shaped channel 40. FIG. 8 illustrates a side view of wheel assembly 18, wherein the wheel (not shown in FIG. 8) may sit on a top surface of the pipe or tube 22 and roll thereon when desired.

FIG. 9 illustrates an end view of wheel assembly 18 showing the wheel 42 sitting on the pipe or tube 22. The wheel 42 may have a surface that is concavely curved to fit the diameter of the pipe or tube 22, thereby securely rolling thereon. Thus, the wheel 42 may be self-seating and free-rolling on the top surface of the pipe or tube 22. The U-shaped channel 40 may have sides that provide protection for the wheel 42 and the pipe or tube 22 from dirt or animals. Specifically, the sides of the U-shaped channel act as a shield to cover the wheel 42 and the pipe or tube 22. However, the U-shaped channel's sides may extend to a distance "B" above the ground to ensure proper clearance of the wheel assembly 18 so that it does not get caught on the ground when the wheel assembly 18 rolls thereon. Preferably, the sides of the U-shaped channel may provide between ½" to ¾" clearance between the ground and the bottom of the sides of the U-shaped channel.

When the hook-shaped brake pin 46 is disengaged from the pipe or tube 22, the wheel assembly may freely roll on the top surface of the pipe or tube 22, as illustrated in FIG. 9. FIG. 10 illustrates the hook-shaped brake pin 46 engaged with the pipe or tube 22 thereby preventing free-rolling of the wheel assembly 18. Specifically, the hook-shaped pin 46 may be pushed into one of the plurality of holes 24 disposed in the top surface of the pipe or tube 22, thereby locking the wheel assembly 18 into a desired position. When locked, the wheel assembly 18 may therefore prevent movement of the poultry coop thereon.

A plurality of wheel assemblies 18, as described above, may be utilized to provide movement of the poultry coop 12 that may be situated thereon. As described above, side assemblies 16 may comprise first and second side channels 50 and 52, as illustrated in FIG. 11, each having wheels assemblies 18 on ends thereof, that may be utilized to support the poultry coop 12 thereon, and allow the poultry coop 12 to move on the rails 20. Specifically, first side channel 50 may have a pair of wheel assemblies 18 on opposite ends thereof, and a bridging inner channel 54 disposed therebetween. The bridging inner channel 54 may span between and fit within wheel assemblies 18, specifically within upside-down U-shaped channel 40 of each wheel assembly 18, thereby allowing the first side channel 50 to telescope to fit multiple desired lengths, as needed. Likewise, the second side channel 52 may have a pair of wheel assemblies 18 on opposite ends thereof, and a bridging inner channel 56 disposed therebetween. The bridging inner channel 56 may span between and fit within wheel assemblies 18, specifically within upside-down U-shaped channel 40 of each wheel assembly 18, thereby allowing second side channel 52 to telescope to fit multiple desired lengths, as needed. Specifically, depending on the size of the poultry coop 12, the first and second side channels 50, 52 may be sized accordingly to fit therebeneath and allow the poultry coop 12 to slide along the rails 20.

To provide additional support and security, cross channels 60, 70 may span between the first and second side channels 50, 52. The first cross channel 60 may comprise a pair of outer channels 62, 64 and a bridging inner channel 66 disposed therebetween that may fit within outer channels 62, 64. Likewise, the second cross channel 70 may comprise a pair of outer channels 72, 74 and a bridging inner channel 76 disposed therebetween that may fit within outer channels 72, 74. Thus, first and second cross channels 60, 70 may telescope inwardly and outwardly to fit a desired span between the first and second side channels 50, 52, depending on the distance between the rails 20. The first and second cross channels 60, 70 may be bolted, bracketed, or otherwise held to the first and second side channels 50, 52, respectively.

The poultry coop 12 may be bracketed to the first and second side channels 50, 52 in any manner. Preferably, the poultry coop 12 may be bracketed to the first and second side channels using brackets that allow for ease of assembly and to prevent slippage, as illustrated in FIGS. 12 and 13. Specifically, the poultry coop 12 may have a lower support bar 80 forming space 14 on a bottom side of the poultry coop 12. Disposed beneath the lower support bar 80 may be lock bracket spacers 82a, 82b that may be slotted and bolted to bolts 84a, 84b that are held through the bridging member 54 of the first side channel 50. The slots on the lock bracket spacers 82a, 82b allow for positional adjustments that may be necessary for the lock bracket spacers 82a, 82b when disposed on the side channel 50, specifically because bridging inner channels 54, 56, as described above, may have a top surface that is lower than wheel assemblies 18, requiring the bracket spacers 82a, 82b to fill the gap. The lower support bar 80 of the poultry coop 12 may sit atop the lock bracket spacers 82a, 82b, and may be held down via lock bracket pairs 86 and 88. Specifically, lock bracket pair 86 may comprise right lock bracket 86a and left lock bracket 86b, and lock bracket pair 88 may comprise right lock bracket 88a and left lock bracket 88b. Each may extend on opposite sides of the first side channel 50 and may be bolted via the bolts 84a, 84b, respectively, and may mate and interlock together to hold the lower support bar 80 and, thus, the poultry coop 12 to the side channel 50. Although not shown, the second side channel 52 may have similar elements to hold the poultry coop 12 thereon.

Thus, in operation, the poultry coop 12 may slide along rails 20 when desired to move the poultry coop 12 from a first position to a second position. Several different positions may be identified along a length of rails, and so the poultry coop 12 may be positioned at any desired position, depending on the length of the rails disposed therebeneath. Thus, the ground beneath and around the poultry coop 12 may be repaired and rehabilitated after a period of time.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A poultry coop carriage and rail system comprising:
    a first rail disposed on a surface of the ground having a concave upper surface; and
    a poultry coop having a bottom and a first wheel assembly comprising at least one wheel on the bottom of the poultry coop,
    wherein the at least one wheel of the first wheel assembly has a convex surface for rolling on the concave upper surface of the first rail.

2. The poultry coop carriage and rail system wherein the first rail comprises a flange extending from the first rail and embedded in the ground and configured to hold the rail in position on the ground.

3. The poultry coop carriage and rail system of claim 2 wherein the concave upper surface of the first rail is formed from a first tube and the flange extends downwardly from the tube into the ground.

4. The poultry coop carriage and rail system of claim 3 wherein the flange is formed from a partial portion of a second tube attached to a bottom surface of the first tube.

5. The poultry coop carriage and rail system of claim 1 further comprising:
    a second rail disposed on the surface of the ground having a concave upper surface; and
    a second wheel assembly comprising at least one wheel on the bottom of the poultry coop,
    wherein the at least one wheel of the second wheel assembly has a convex surface for rolling on the concave upper surface of the second rail.

6. The poultry coop carriage and rail system of claim 5 wherein the second rail comprises a flange extending from the first rail and embedded in the ground and configured to hold the rail in position on the ground.

7. The poultry coop carriage and rail system of claim 5 wherein the first wheel assembly is proximal to a first end of the poultry coop and the second wheel assembly is proximal a second end of the poultry coop, wherein the first end of the poultry coop is opposite the second end of the poultry coop.

8. The poultry coop carriage and rail system of claim 5 further comprising:
a crossbeam extending between the first wheel assembly and the second wheel assembly.

9. The poultry coop carriage and rail system of claim 8 wherein the crossbeam is adjustable in length.

10. The poultry coop carriage and rail system of claim 5 further comprising:
a third rail disposed on the surface of the ground having a concave upper surface; and
a third wheel assembly comprising at least one wheel on the bottom of the poultry coop,
wherein the at least one wheel of the third wheel assembly has a convex surface for rolling on the concave upper surface of the second rail.

11. The poultry coop carriage and rail system of claim 1 further comprising:
a stake extending through the flange configured to hold the flange in the ground.

12. The poultry coop carriage and rail system of claim 1 wherein the wheel assembly comprises a side cover, wherein the side cover has a bottom edge that is configured to be disposed a distance of ¾ inch or less above the ground.

13. The poultry coop carriage and rail system of claim 11 wherein the first wheel assembly is proximal to a first end of the poultry coop, the second wheel assembly is proximal a second end of the poultry coop, wherein the first end of the poultry coop is opposite the second end of the poultry coop, and the third wheel assembly is positioned on the bottom of the poultry coop between the first and second wheel assemblies.

14. The poultry coop carriage and rail system of claim 1 further comprising:
a bracket having a downwardly extending, vertically-disposed element attached to the bottom of the poultry coop and having a vertical slot therein;
a receiving aperture in the first wheel assembly; and
a connector connecting the downwardly extending element of the bracket to the first wheel assembly, wherein the connector comprises a pin disposed through the vertical slot of the downwardly extending element and the receiving aperture in the wheel assembly.

15. The poultry coop carriage and rail system of claim 1 further comprising:

a brake at the first wheel assembly wherein the brake comprises a pin configured to move between an up and a down position, and wherein when the pin is in the down position, the pin engages a hole in the upper surface of the first rail.

16. A method of moving a movable poultry coop comprising the steps of:
providing a poultry coop carriage and rail system comprising a first rail disposed on a surface of the ground having a concave upper surface, and a poultry coop having a bottom and a first wheel assembly comprising at least one wheel on the bottom of the poultry coop, wherein the at least one wheel of the first wheel assembly has a convex surface for rolling on the concave upper surface of the first rail;
disposing the poultry coop in a first location on the first rail by engaging the convex surface of the first wheel on the concave surface of the first rail.

17. The method of claim 16 further comprising the steps of:
providing a brake at the first wheel assembly wherein the brake comprises a pin and the first rail comprises a hole on the upper surface thereof; and
engaging the pin of the brake in the hole on the upper surface of the first rail to prevent movement of the first wheel along the first rail.

18. The method of claim 16 further comprising the steps of:
providing a bracket having a vertically-disposed element attached to the bottom of the poultry coop and having an element extending downwardly, the downwardly extending element having a vertical slot therein;
providing a receiving aperture in the first wheel assembly;
providing a connector connecting the downwardly extending element of the bracket to the first wheel assembly, wherein the connector comprises a pin disposed through the vertical slot of the downwardly extending element and the receiving aperture in the wheel assembly; and
moving the pin within the vertical slot of the downwardly extending element to adjust the position of the coop on the wheel assembly.

19. The method of claim 16 further comprising the step of:
moving the poultry coop to a second location on the first rail by rolling the first wheel along the first rail.

20. The method of claim 19 further comprising the steps of:
providing a brake at the first wheel assembly; and
engaging the brake at the first wheel assembly to prevent movement of the first wheel along the first rail.

\* \* \* \* \*